United States Patent [19]
Morris et al.

[11] Patent Number: 4,906,709
[45] Date of Patent: Mar. 6, 1990

[54] BLENDS OF POLYCARBONATES WITH POLYESTERS FROM TRANS-4,4'-STILBENEDICARBOXYLIC ACID AND 1,6-HEXANEDIOL

[75] Inventors: John C. Morris; Winston J. Jackson, Jr., both of Kingsport, Tenn.

[73] Assignee: Eastman Kodak Company, Rochester, N.Y.

[21] Appl. No.: 288,895

[22] Filed: Dec. 23, 1988

[51] Int. Cl.$^4$ .................... C08F 20/00; C08L 69/00
[52] U.S. Cl. .................... 525/439; 525/466; 428/34.1
[58] Field of Search ................ 525/439, 466; 528/304

[56] References Cited

U.S. PATENT DOCUMENTS

| | | | |
|---|---|---|---|
| 2,657,194 | 10/1953 | Butler et al. | 260/75 |
| 2,657,195 | 10/1953 | Toland Jr. | 260/75 |
| 3,190,174 | 6/1965 | Field | 88/26 |
| 3,247,043 | 4/1966 | Cardina | 156/314 |
| 3,496,839 | 2/1970 | Hartle | 204/159.19 |
| 3,842,040 | 10/1974 | Browne et al. | 260/75 M |
| 3,842,041 | 10/1974 | Browne et al. | 260/75 M |
| 4,073,777 | 2/1978 | O'Neill et al. | 260/75 S |
| 4,420,607 | 12/1983 | Morris et al. | 528/298 |
| 4,459,402 | 7/1984 | Morris et al. | 528/298 |
| 4,468,510 | 8/1984 | Morris et al. | 528/298 |
| 4,526,822 | 7/1985 | Morris et al. | 428/35 |
| 4,619,976 | 10/1976 | Morris et al. | 525/439 |

FOREIGN PATENT DOCUMENTS

47-72348 7/1974 Japan .

OTHER PUBLICATIONS

Meurisse, et al., British Polymer Journal, vol. 13, 1981 p. 57 (Table 1).

Jackson and Morris, Journal of Applied Polymer Science, Applied Polymer Symposium, 41, pp. 307-326 (1985).

U.S. Ser. No. 288,896, filed Dec. 23, 1988, by Morris et al., entitled "Blends of Polycarbonates with Polyesters from 4,4'-Biphenyldicarboxylic Acid and 1,6-Hexanediol".

*Primary Examiner*—Theodore E. Pertilla
*Attorney, Agent, or Firm*—John P. Stevens; William P. Heath, Jr.

[57] ABSTRACT

Disclosed are compositions of matter characterized by having a tensile strength of at least 13,000 psi and moldable at temperatures below 285° C. comprising a blend of (a) about 10-95 weight % of a polyester containing repeating units from trans-4,4'-stilbenedicarboxylic acid 1,6-hexanediol, and (b) about 90-5 weight % of a polycarbonate of 4,4'-isopropylidenediphenol.

9 Claims, No Drawings

BLENDS OF POLYCARBONATES WITH POLYESTERS FROM TRANS-4,4'-STILBENEDICARBOXYLIC ACID AND 1,6-HEXANEDIOL

TECHNICAL FIELD

This invention relates to blends of polycarbonates with certain polyesters which are especially useful as films, fibers, and molding plastics. This invention is particularly concerned with blends of polycarbonates with polyesters of trans-4,4'-stilbenedicarboxylic acid and 1,6-hexanediol.

BACKGROUND OF THE INVENTION

U.S. Pat. No. 2,657,195 broadly discloses polyesters of various stilbenedicarboxylic acid isomers with glycols, aminoalcohols, and diamines. Various glycols are disclosed containing 2 to 16 carbon atoms.

U.S. Pat. No. 3,496,839 relates to low molecular weight homopolymers of 4,4'-stilbenedicarboxylic acid and aliphatic glycols useful in radiation-cured cross-linked polyester coatings. 1,6-Hexanediol is disclosed in column 2, lines 20 to 44, in a general listing of the glycols useful in these coatings. Neither U.S. Pat. No. 2,657,195 nor U.S. Pat. No. 3,496,839 distinguishes one stilbenedicarboxylic acid isomer from another, i.e., 4,4'- from 3,3'- or cis- from trans-, etc.

Our own U.S. Pat. Nos. 4,420,607, 4,459,402, 4,468,510, 4,526,822, 4,728,718, 4,728,719, and 4,728,720 all disclose polyesters based on trans-4,4'-stilbenedicarboxylic acid using various glycols which include 1,6-hexanediol.

Other patents which disclose trans-4,4'-stilbenedicarboxylic acid are Japanese Kokai 72348/74, and U.S. Pat. Nos. 2,657,194, 3,190,174, 3,247,043, 3,842,040, 3,842,041, and 4,073,777. Polyesters of trans-4,4'-stilbenedicarboxylic acid and neopentyl glycol, 1,5-pentanediol, 1,6-hexandediol, and 1,10-decanediol are disclosed by Meurissè, et al., in the *British Polymer Journal,* Vol. 13, 1981, page 57 (Table 1). Jackson and Morris disclose homopolyesters from trans-4,4'-stilbenedicarboxylic acid and various aliphatic glycols in the *Journal of Applied Polymer Science, Applied Polymer Symposium,* 41, 307-326 (1985).

U.S. Pat. No. 4,619,976 discloses a blend of (1) a polyester of terephthalic acid, trans-4,4'-stilbenedicarboxylic acid and 1,4-cyclohexanedimethanol and (2) a polycarbonate.

DISCLOSURE OF THE INVENTION

According to the present invention, there are provided blends of
(1) about 10–95 weight % of a polyester containing repeating units from at least 80 mol % trans-4,4'-stilbenedicarboxylic acid and at least 80 mol % 1,6-hexanediol, based on 100 mol % of an acid component and 100 mol % of a glycol component, said polyester having an I.V. of at least 0.8 and
(2) about 90–5 weight % of a polycarbonate of 4,4'-isopropylidenediphenol, having an I.V. of at least 0.3.

The blends according to the present invention provide molding plastics and containers having improved tensile strengths.

In addition, the blends of this invention have improved chemical resistance, compared to bisphenol A polycarbonate, to solvents such as ethyl acetate, ethanol, water, 20% sulfuric acid, 10% sodium hydroxide, regular grade gasoline, acetone, acetic acid, 5% Clorox bleach, 50/50 water/ethanol, benzyl alcohol, and 10% nitric acid.

According to the present invention, the polyester comprises repeating units from at least 80 mol % trans-4,4'-stilbenedicarboxylic acid and repeating units from at least 80 mol % 1,6-hexanediol, the total mol % of acid components and glycol components each being 100 mol %, and the polyester having an inherent viscosity of 0.3 or more determined at 25° C. in 25/35/40 (wt/wt/wt) phenol/tetrachloroethane/p-chlorophenol at a concentration of 0.1/100 mL.

The polyesters of this invention are prepared from trans-4,4'-stilbenedicarboxylic acid and/or its esters, and 1,6-hexanediol. Examples of such useful esters are the dimethyl, diethyl, dibutyl, and diphenyl esters, etc., or any combination of these esters. The polyesters may also be prepared from glycol esters or half-ester/half-acid derivatives of trans-4,4'-stilbenedicarboxylic acid.

The acid portion of the polyesters may contain minor amounts of other aromatic dicarboxylic acids such as terephthalic acid, isophthalic acid, 1,5-, 1,4-, 2,6-, or 2,7-naphthalenedicarboxylic acid, 4,4'-diphenyldicarboxylic acid, and the like. The dicarboxylic acid portion of the polymer may also contain minor amounts of aliphatic or cycloaliphatic dicarboxylic acids such as malonic, succinic, glutaric, adipic, pimelic, suberic, azelaic, sebacic, cis- or trans-1,4-cyclohexanedicarboxylic, or dodecanedicarboxylic acid. These polyesters may contain up to about 20 mol % of these other dicarboxylic acids such that the sum of the dicarboxylic acid components is equal to 100 mol %. Essentially 100% trans-4,4'-stilbenedicarboxylic is preferred as the acid component.

The glycol portion of these polymers may contain minor amounts (not exceeding about 20 mol %) of other glycols such that the sum of the glycol components is equal to 100 mol %. Examples of useful glycols are ethylene glycol, 1,4-butanediol, 1,2-propanediol, 1,3-propanediol, 2,2-dimethyl-1,3-propanediol, trans-or cis-2,2,4,4-tetramethyl-1,3-cyclobutanediol, 1,5-pentanediol, 1,3- or 1,4-cyclohexanedimethanol, or p-xylenediol.

The polyester portion of the blends may be prepared using conventional techniques well known to those skilled in the art. For example, the references cited herein contain such techniques, and are incorporated herein by reference.

The polycarbonate portion of the blend consists of the polycarbonate of 4,4'-isopropylidenediphenol (bisphenol A). The polycarbonate portion of the blends is prepared in the melt, in solution, or by interfacial polymerization techniques well known in the art.

Many such polycarbonates are commercially available, and are normally made by reacting bisphenol A with phosgene, dibutyl carbonate, diphenyl carbonate, etc. Conventional additives such as pigments, dyes, stabilizers, plasticizers, etc. may be used in the polyester, polycarbonate and blends according to this invention.

The inherent viscosity of the polyester portion of the blends is at least 0.8 but preferably 1.0 or more. The inherent viscosity of the bisphenol A polycarbonate portion of the blends is at least 0.3 but preferably 0.5 or more.

The polyester/polycarbonate blends may be made by conventional techniques. Pellets of the polyester may be mixed with pellets of the polycarbonate and subsequently melt blended to form a homogeneous mixture.

The blends of this invention may contain antioxidants, conventional flame retardants such as a phosphorus compound, a halogen compound, or a halogen compound in combination with an antimony compound, fillers such as talc or mica, or reinforcing agents such as glass fiber, carbon fiber, or Kevlar [poly(1,4-phenylene terephthalamide)].

The inherent viscosities are determined at 25° C. in 25/35/40 (wt/wt/wt) phenol/tetrachloroethanol/-p-chlorophenol at a concentration of 0.1 g/100 mL.

The examples which follow are submitted for a better understanding of the invention.

The polyester and the polycarbonate are ground to pass a 3-mm screen and dry blended. The dry blends are dried in a vacuum oven at 80°–100° C. and then extruded and pelletized at 280° C. on a ¾ inch Brabender extruder equipped with a screen pack and a mixing screw. The blends are injection-molded on a one-ounce Watson-Stillman molding machine to give 1/16-inch D1822 Type L tensile bars. The tensile strength is determined using ASTM D638 procedures and the average of five breaks is reported in Table 1.

EXAMPLE 1

This example illustrates the preparation of the polyester used in the blends consisting of 100 mol % of trans-4,4'-stilbenedicarboxylic acid units and 100 mol % 1,6-hexanediol units.

A mixture of 177.6 g (0.60 mol) dimethyl trans-4,4'-stilbenedicarboxylate, 92.0 g (0.78 mol) 1,6-hexanediol, and a 0.13 g titanium tetraisopropoxide as catalyst is placed in a 1-liter flask equipped with an inlet for nitrogen, a metal stirrer, and a short distillation column. The flask is heated in a Wood's metal bath at 240° C. for about 1 hour and the temperature is raised to 260° C. for about 30 minutes. A vacuum of 0.6 mm is gradually applied over the next 5 minutes. Full vacuum is maintained for about 15 minutes. A high melt viscosity opaque fibrous polymer is obtained having an I.V. of 1.24.

EXAMPLE 2

This example illustrates the preparation of a 70/30 wt/wt blend of the polyester in Example 1 and bisphenol A polycarbonate.

A dry blend of 210 g of polyester having an I.V.=1.08 prepared according to a procedure similar to that in Example 1 and 90 g of Merlon M40 polycarbonate (the polycarbonate from bisphenol A and phosgene) is prepared by roll mixing. The blend is dried, extruded, and pelletized at 280° C. and then injection-molded at 260° C. to give molded bars having a tensile strength of 30,000 psi.

The other examples in Table 1 are prepared according to procedures similar to those used in Examples 1 and 2. The bisphenol A polycarbonate used in these examples is Merlon M40 polycarbonate.

TABLE 1
Tensile Properties of Polycarbonate/Polyester Blends in Accordance with This Invention

| Ex. | PC Content, Wt % | (SDA)(HD) Polyester Content, Wt % | Molding Temp. °C.[a] | I.V. Before Molding[b] | I.V. After Molding[b] | Tensile Strength, 10³ psi |
|---|---|---|---|---|---|---|
| 1 | 100 | 0 | 290 | 0.56 | — | 11.2 |
| 2 | 95 | 5 | 275 | 0.55 | 0.47 | 11.0 |
| 3 | 90 | 10 | 280 | 0.61 | 0.51 | 13.5 |
| 4 | 80 | 20 | 275 | 0.67 | 0.54 | 13.1 |
| 5 | 80 | 20 | 265 | 0.55 | — | 13.8 |
| 6 | 70 | 30 | 265 | 0.86 | 0.82 | 16.0 |
| 7 | 40 | 60 | 270 | 1.21 | 1.16 | 28.2 |
| 8 | 30 | 70 | 260 | 0.97 | 0.89 | 30.0 |
| 9 | 20 | 80 | 275 | 1.22 | 1.00 | 25.1 |
| 10 | 10 | 90 | 260 | 1.13 | 1.05 | 22.3 |
| 11 | 5 | 95 | 265 | 1.22 | 1.00[c] | 20.0 |
| 12 | 0 | 100 | 260 | 1.08 | 0.99 | 17.7 |

[a]The polymers are injection-molded on a 1 oz Watson-Stillman molding machine.
[b]Inherent viscosities are determined in 25/35/40 phenol/tetrachloroethane/p-chlorophenol at a concentration of 0.1 g/100 mL at 25° C.
[c]Some insoluble material was reported during the inherent viscosity determination.
Codes:
SDA = trans-4,4'-stilbenedicarboxylic acid
HD = 1,6-hexanediol
PC = Merlon M40 Polycarbonate It is apparent from Table 1 that the tensile strength of polycarbonate containing little or no polyester is significantly improved by blending it with at least 10% by weight polyester. The tensile strength increases from about 11,000 psi with little or no polyester in the blend to about 13,500 psi with the addition of 10% polyester. On the other hand, the tensile strength decreases from about 20,000 psi with blends containing 5% polycarbonate to about 17,700 psi when the polycarbonate is completely omitted. The most dramatic improvements, however, are blends containing about 60–90 wt % polyester and about 40–10 wt % polycarbonate.

While the invention has been described in detail with particular reference to preferred embodiments thereof, it will be understood that variations and modifications can be effected within the spirit and scope of the invention.

We claim:
1. Composition of matter comprising a blend of
   (a) about 10–95 weight % of a polyester containing repeating units from at least 80 mol % trans-4,4'-stilbenedicarboxylic acid and at least 80 mol % 1,6-hexanediol, based on 100 mol % of an acid component and 100 mol % of a glycol component, said polyester having an I.V. of at least 0.8 and
   (b) about 90–5 weight % of a polycarbonate of 4,4'-isopropylidenediphenol having an I.V. of at least 0.3, the I.V. of said polyester and polycarbonate being determined at 25° C. in 25/35/40 by wt phenol/tetrachloroethanol/p-chlorophenol at a concentration of 0.1 g/100 mL.
2. Composition according to claim 1 comprising about 60–90 weight % polyester and about 40–40 weight % polycarbonate.
3. Composition according to claim 1 wherein said polyester consists essentially of repeating units from trans-4,4'-stilbenedicarboxylic acid and 1,6-hexanediol.
4. Composition of matter comprising a blend of
   (a) about 60–90 weight % of a polyester consisting essentially of repeating units from trans-4,4'-stilbenedicarboxylic acid and 1,6-hexanediol, said polyester having an I.V. of at least 0.8, and
   (b) about 40–10 weight % of a polycarbonate of 4,4'-isopropylidenediphenol having an I.V. of at least 0.3.
5. A composition of matter according to claim 1 characterized by having a tensile strength of at least 13,000 psi.
6. A fiber comprising the blend of claim 1.
7. A film comprising the blend of claim 1.
8. A container comprising the blend of claim 1.
9. A molded object comprising the blend of claim 1.

* * * * *

UNITED STATES PATENT AND TRADEMARK OFFICE
CERTIFICATE OF CORRECTION

PATENT NO. : 4,906,709

DATED : March 6, 1990

INVENTOR(S) : John C. Morris, Winston J. Jackson, Jr.

It is certified that error appears in the above-identified patent and that said Letters Patent is hereby corrected as shown below:

Title page, Attorney, Agent, or Firm - "John P. Stevens" should read --- John F. Stevens ---

Column 4, line 50, Claim 2 "40-40" should read --- 40-10 ---

Signed and Sealed this

Second Day of April, 1991

Attest:

HARRY F. MANBECK, JR.

*Attesting Officer*  *Commissioner of Patents and Trademarks*